United States Patent [19]

McHenry

[11] Patent Number: 4,879,560
[45] Date of Patent: Nov. 7, 1989

[54] RADAR TEST DEVICE WITH ROTATOR INSIDE SUBJECT-SUPPORT FIXTURE

[75] Inventor: Mark A. McHenry, Stanford, Calif.

[73] Assignee: Northrop Corporation, Hawthorne, Calif.

[21] Appl. No.: 215,675

[22] Filed: Jul. 6, 1988

[51] Int. Cl.⁴ .............................................. G01S 7/40
[52] U.S. Cl. ................................................. 342/165
[58] Field of Search ............... 342/5, 165, 166, 169, 342/170, 171, 173

[56] References Cited

U.S. PATENT DOCUMENTS

| | | | |
|---|---|---|---|
| 2,448,889 | 9/1948 | Johnson et al. | 342/166 |
| 2,510,299 | 6/1950 | Schramm | 342/165 |
| 2,665,383 | 1/1954 | Marie | 342/5 |
| 2,801,411 | 7/1957 | Weinstock | 342/5 |
| 2,942,257 | 6/1960 | Huntington | 342/165 |
| 2,977,590 | 3/1961 | Lovick | 342/166 |
| 3,018,566 | 1/1962 | Krueger . | |
| 3,153,760 | 10/1964 | Henderson | 342/165 |
| 3,216,014 | 11/1965 | Kerr . | |
| 3,719,077 | 3/1973 | Haupt et al. | 342/166 |
| 3,842,418 | 10/1974 | Lorber . | |
| 4,106,345 | 8/1978 | Saunders . | |
| 4,109,699 | 4/1977 | Wintersdorff et al. | 342/5 X |
| 4,345,254 | 8/1982 | Skomal . | |
| 4,415,898 | 11/1983 | Gaunaurd . | |
| 4,521,780 | 6/1985 | Preikschat . | |
| 4,598,294 | 7/1986 | Guhse | 342/170 |
| 4,621,265 | 11/1986 | Buse et al. | 342/169 |

OTHER PUBLICATIONS

J. F. Hunka et al. "A Technique for the Rapid Measurement of Bistatic Radar Cross Sections", IEEE Transaction on Antenna and Propagation, Vol. AP-25, No. 2, pp. 243-248, March, 1977.

L. A. Cram et al. "Development of Model Radar Systems Between 30 and 900 GHz", The Radio and Electronic Engineer, Vol. 49, No. 7/8, pp. 381-388, July/August, 1979.

*Primary Examiner*—Thomas H. Tarcza
*Assistant Examiner*—John B. Sotomayor
*Attorney, Agent, or Firm*—Terry J. Anderson; Robert B. Block

[57] ABSTRACT

Measurement of radar cross section is provided by a rotatable platform which supports a test subject to be measured, the rotatable platform and a rotator thereof being enclosed within a fixture configured as a body shaped as an airfoil. A second rotator rotates the fixture body to face a radar antenna which illuminates the test subject, the orientation of the fixture body being selected to minimize a radar cross section of the fixture body. The configuration of the generally airfoil shape minimizes radar cross section in a preferred direction of the body. A metallic seal in the form of a thin foil overlays an interface between the rotatable platform and a surface of the fixture in the manner of a fairing which reduces spurious reflections from the vicinity of the rotator, the seal being formed of a foil having a thickness substantially less than one-quarter wavelength of radiation of the antenna to inhibit generation of reflections from the seal. This permits measurement of very low radar cross sections of the test subject.

5 Claims, 3 Drawing Sheets

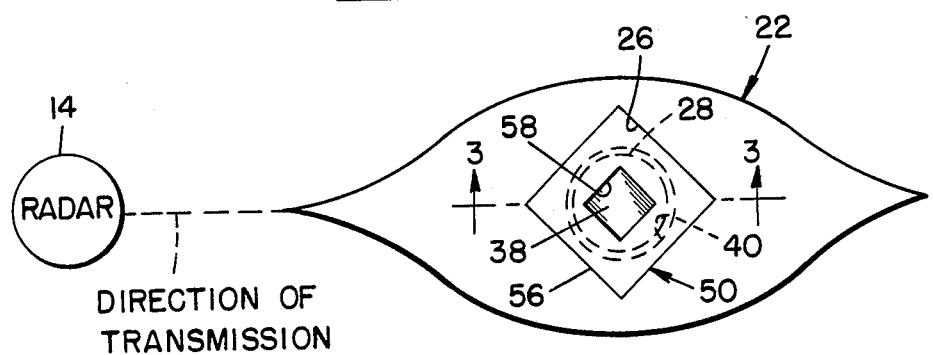
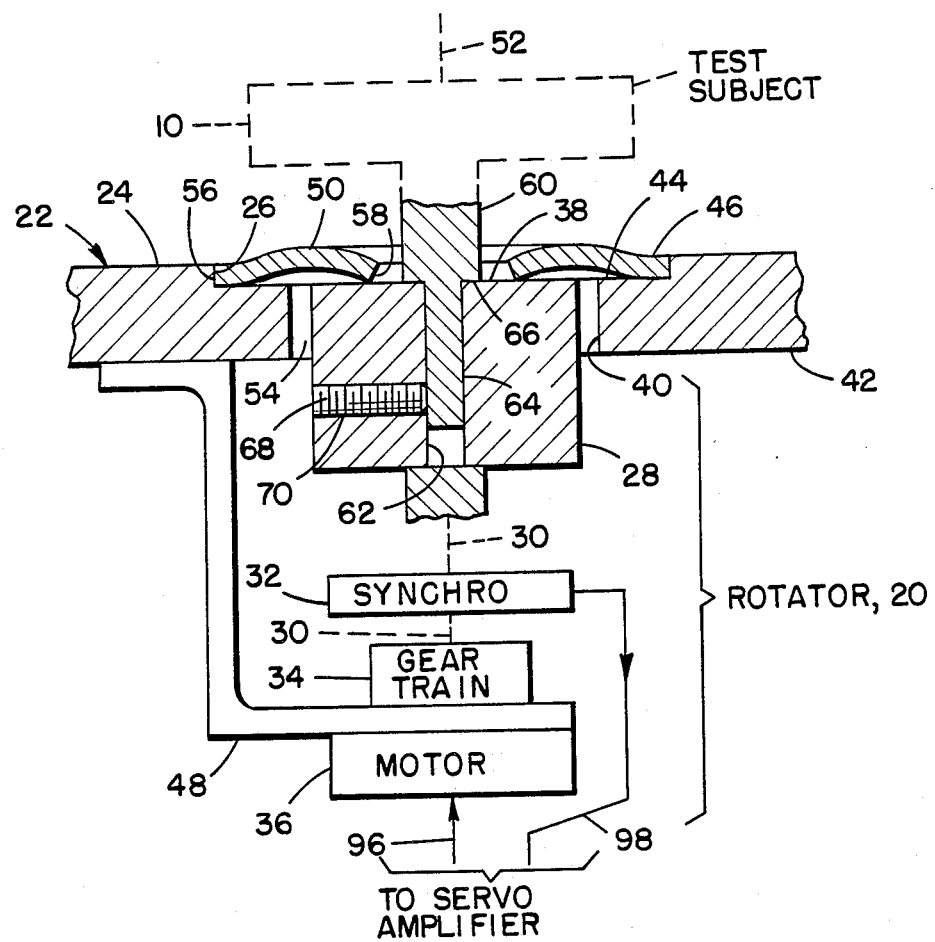

RADAR TEST DEVICE WITH ROTATOR INSIDE SUBJECT-SUPPORT FIXTURE

BACKGROUND OF THE INVENTION

This invention relates to the measurement of radar target cross section of a test subject and, more particularly, to the provision of a rotatable test subject in an environment which inhibits unwanted reflections from a test environment back towards a radar antenna employed in conducting the test.

In the measurement of radar cross section, it is common practice to employ a test fixture of low radar cross section upon which the subject with its unknown radar cross section is mounted. By measuring the combined radar cross section, the subject's radar cross section in conjunction with a ground plane can be determined. Often, a test fixture and subject may be rotated during a measurement procedure to obtain cross-sectional data as a function of subject orientation relative to a radar antenna.

A problem arises in the use of test fixtures which support a subject in front of a radar antenna in that a test fixture may also reflect radar transmissions back toward the radar antenna. Extraneous reflections are exacerbated in a situation in which a test fixture rotates with a rotating subject because the rotation increases the difficulty of separating subject reflections from reflections from the test fixture. Reflections emanating from the test fixture tend to mask reflections from the test subject and, thereby, reduce the accuracy of data provided by measurements of the test subject.

SUMMARY OF THE INVENTION

The foregoing problem is overcome and other advantages are provided by a test fixture, constructed in accordance with the invention, for rotatably supporting a radar test subject in front of a radar antenna during measurement of test subject parameters. The test fixture is formed with an outer curved reflecting shield mounted on a pedestal or pylon of sufficient height relative to the location of a radar antenna to prevent generation of reflections from nearby terrain, which reflections would mask measurements of the test subject. The fixture with the curved shield may be rotated about the pylon to minimize radar cross section of the fixture in a direction towards the antenna.

The fixture has a front surface which is angled relative to a direction of propagation of a beam of radiation transmitted from the radar antenna so as to deflect any radiation echoes, emanating from the fixture, away from a return path toward the antenna. A rotatable supporting platform is disposed within the test fixture. A mechanism for rotating the platform is disposed behind the platform, and is hidden from view of the antenna by the fixture. The test subject is carried by the platform, and protrudes through an opening in the fixture so as to be illuminated by radiation from the antenna. Thereby, the fixture prevents illumination of the mechanism employed in rotating the platform.

It is recognized that a boundary, or edge, at an interface between the fixture opening and the rotatable platform may also serve as a source of reflection of the radiation. Such reflection, in accordance with a further feature of the invention, is substantially eliminated by the construction of a seal of thin foil of opaque material which partially encloses the opening so as to cover the interfacing edges of shield and platform. A thin metallic foil which reflects radiation is employed in the preferred embodiment of the invention. The foil is much thinner than a quarter-wavelength of the radiation so as to offer virtually no reflecting cross section to any exposed edge of the foil.

The foregoing construction permits a test subject to be viewed by a radar during rotation of the subject without introduction of any significant radiation from the test device which supports the test subject.

BRIEF DESCRIPTION OF THE DRAWING

The aforementioned aspects and other features of the invention are explained in the following description, taken in connection with the accompanying drawing wherein:

FIG. 2 is a plan view of the test fixture taken along a line 2—2 in FIG. 1;

FIG. 3 is a sectional view of a subject rotator of the test device taken along a line 3—3 in FIG. 2.

DETAILED DESCRIPTION

Figure 1:
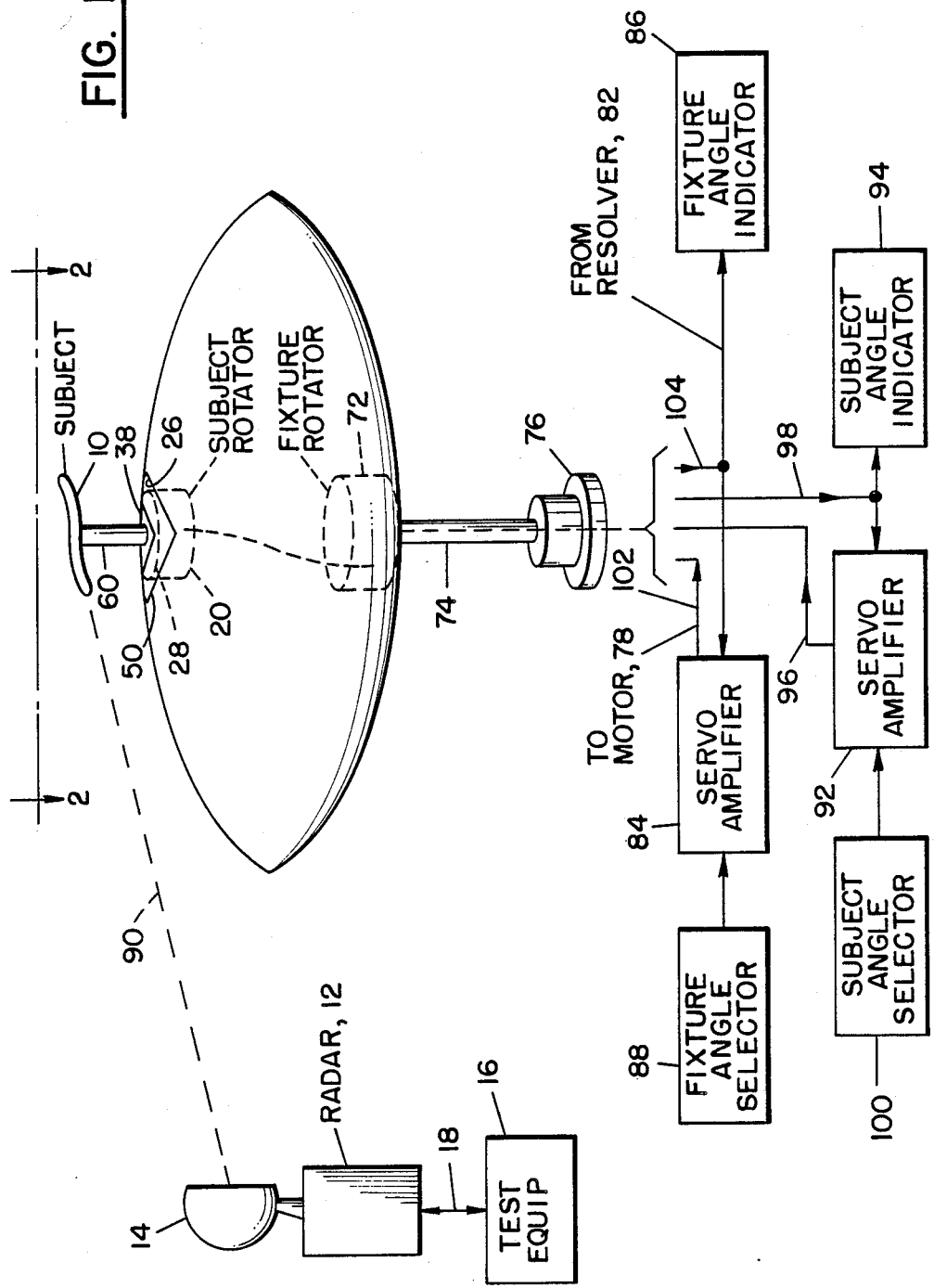
FIG. 1 is a stylized view of the test fixture of the invention with a test subject supported thereon for illumination by a radar, portions of the view being indicated diagrammatically.

FIG. 1 shows a test subject 10 positioned in front of a radar set 12 which includes a well-known transmitter and receiver (not shown) of radar signals. A radar antenna 14 is disposed on top of the set 12 for directing a beam of radiation carrying a radar signal to the subject 10, and for receiving a radar signal from the subject 10. Test equipment 16 is connected via line 18 to the radar set 12 for outputting data, such as signal strength and spectral components of echoes reflected from the subject 10 to the antenna 14.

In accordance with a feature of the invention, the subject 10 is supported by a rotator 20 disposed within a fixture 22 having an outer smooth surface 24 of electrically conductive material, such as copper or aluminum, which shields the rotator 20 from radiation, incident upon the fixture 22, from the antenna 14. The surface 24 reflects the incident radiation away from the rotator 20, reflected rays of radiation being directed away from the antenna 14. Thereby, there are no echoes from the rotator 20, and echoes from the fixture 22 are directed away from the antenna 14 to ensure that measurements of the test subject 10 are free of extraneous reflections of radiation.

The subject 10 protrudes through an opening 26 in the fixture 22 to be illuminated by radiation transmitted by the antenna 14. Therefore, only echoes of radiant energy radiating from the subject 10 are received at the antenna 14 to enable accurate measurement of radiation signature of the subject 10 in connection with a ground plane. Rotation of the subject 10 by the rotator 20 permits subject signature to be measured as a function of angle about an axis of the rotation.

With reference also to FIGS. 2 and 3, the rotator 20 comprises a circular turntable 28 connected by a shaft 30 to a synchro 32 and a gear train 34. A motor 36 drives the turntable 28 via the gear train 34 to impart a desired rotation to the turntable 28. A top surface 38 of the turntable 28 fits into the opening 26 of the fixture 22. In FIG. 2, the test subject 10 has been deleted, and in FIG. 3 the test subject 10 is shown in phantom for clarity.

The opening 26 comprises a circular cylindrical passage 40 which extends from a back surface 42 of the fixture 22 almost to the front surface 24, and then expands radially outward into a shelf 44. The shelf 44 is bounded by sidewalls 46 arranged in the form of a diamond, as viewed from the front surface 24. The top surface 38 of the turntable 28 is aligned with the shelf 44. A brace 48 extends from the back surface 42 of the fixture 22 to the motor 36 and gear train 34 to position the rotator 20 relative to the fixture 22 and to hold the turntable 28 within the passage 40.

In accordance with a feature of the invention, the radiation seal 50 is disposed within the shelf 44, and extends inwardly from the sidewalls 46 towards the central axis 52 of the rotator to close off a portion of the opening 26. The seal 50 is formed of radiation opaque material, preferably metal foil, and extends over a clearance space 54 between the turntable 28 and the passage 40. The space 54 provides sufficient clearance to allow rotation of the turntable 28 relative to the fixedly mounted seal 50. The thickness of the seal 50 is equal to the height of the sidewalls 46. An outer boundary 56 of the seal 50 conforms to the diamond-shaped configuration of the sidewalls 46 so as to permit insertion and retention of the seal 50 into the shelf 44 by a pressed fit. An inner boundary 58 of the seal 58 is large enough to clear the test subject 10 on the turntable 28. A slight bowing of the seal 50 urges the inner boundary 58 to contact the top surface 38 of the turntable 28, and to rub against the top surface 38 during rotation of the turntable 28.

The configuration of the seal 50 enables the seal to serve as as a continuation of the front surface 24 of the fixture 22 in the manner of a fairing past the clearance space 54. By constructing the seal 50 of a resilient foil, the inner boundary 58 of the seal can track any displacement of the turntable 28 along a direction of the axis 52 to accommodate any manufacturing tolerances in the construction of the brace 48 and in the positioning of the turntable 28.

As shown in FIG. 2, the orientation of each of the sidewalls 46 is angled relative to a direction of transmission of radar signals from the radar antenna 14 so that any reflections which might develop at the interface between the front surface 24 of the fixture 22 and the outer boundary 56 of the seal 50 are directed away from the radar antenna 14. Furthermore, the equalization of the thickness of the seal 50 to the height of the sidewalls 46 and hence, to the depth of the shelf 44, in combination with the tight fit of the seal 50 and the sidewalls 46 militates against the development of reflections of any significant amount of radiation from the interface between the seal 50 and the surface 24. In a preferred embodiment of the invention, the thickness of the seal 50 is substantially less than one-quarter wavelength of the radiation from the antenna 14 so as to introduce no more than an insignificant reflection from the inner boundary 58 of the seal 50, it being noted that the inner boundary 58 is exposed to incident radiation in the vicinity of the test subject 10. The covering of the edges of the turntable 28 and the shelf 44 at the clearance space 54 by the seal 50 prevents incident radiation from reaching these edges so as to prevent the generation of any echoes of radiation from these edges. The turntable 28 is also fabricated of electrically conducting material, such as copper or aluminum, so as to coact with the seal 50 and the fixture 22 in shielding the rotator 20, and in forming an electrical ground plane upon which the test subject 10 is mounted.

By way of example, the test subject 10 may be an aircraft antenna positioned above the turntable 28 and the fixture 22 to simulate an installation of the antenna above an aircraft skin. By way of example in securing the subject 10 to the turntable 28, the turntable 28 is provided with a central bore 62 which receives a spindle 64 extending downwardly from an end of the shaft 60. The spindle 64 and the bore 62 have essentially the same diameter, apart from a small clearance which facilitates insertion of the spindle 64 into the bore 62, the diameter being smaller than the diameter of the shaft 60 to create a circular shelf 66 by which the shaft 60 rests upon the top surface 38 of the turntable 28. A set screw 68 extends sidewise through a threaded bore 70 of the turntable 28 to contact the spindle 64 and to lock the subject 10 in position on the turntable 28. Test of flush mounted components such as aircraft lights would be accomplished by machining the turntable 28 to accept the light in the same manner as the light would be installed in an aircraft skin.

Figure 4:
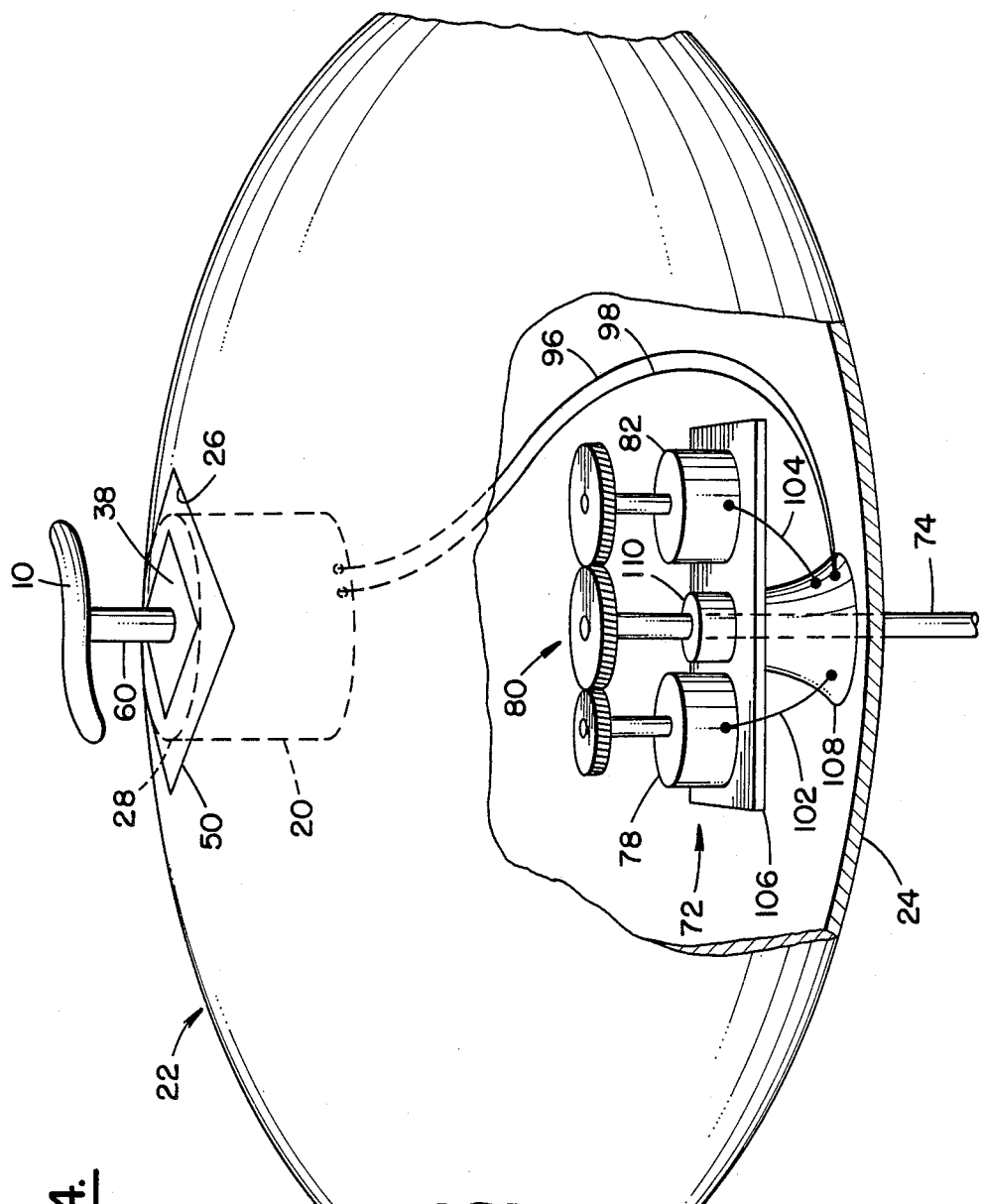
FIG. 4 shows a portion of the fixture cut away to disclose components of a rotator of the fixture about a pylon.

With reference to FIGS. 1 and 4, the fixture 22 has an internal rotator 72, indicated in phantom, and is mounted on a tall pedestal in the form of a pylon 74 which is upstanding from a base 76 which may rest on the earth or other platform. The pylon 74 is constructed of a well known form having a low radar cross section. The fixture 22 is rotated about the pylon 74 by the rotator 72. The rotator 72 includes a motor 78 operatively connected to the pylon 74 by means of a gear train 80. The orientation of the fixture 22, as measured in azimuth relative to the radar antenna 14, is provided by a resolver 82 connected to the pylon 74 by means of the gear train 80. The resolver 82 outputs an electric signal representing the azimuth angle to a servo amplifier 84 and an indicator 86 of the azimuth angle of the fixture 22, the amplifier 84 and the indicator 86 being located at a point of convenience external to the fixture 22. An angle selector 88 which may comprise a well-known analog or digital encoder, is manually operated to apply an electric signal to the amplifier 84 to designate a desired azimuth angle of the fixture 22, the desired azimuth angle providing a minimum radar cross section. The servo amplifier 84 operates in a well-known fashion to form the difference between electric signals outputted by the selector 88 and the resolver 82 to provide a drive signal for energizing the motor 78 to rotate clockwise or counterclockwise for driving the fixture 22 to a desired azimuth angle. The mechanical and electrical connections of the motor 78 with the resolver 82 and the amplifier 84 constitute a feedback loop for rotating the fixture 22 to a desired azimuth angle commanded by the selector 88.

In accordance with the operation of the invention, the test equipment 16 is employed with the radar set 12 to measure the amount of back scattered radiation of the fixture 22 to the antenna 14. It is desired to minimize the amount of the back scattered radiation so as to maximize the accuracy of measurements to be made for the test subject 10. Prior to mounting the test subject 10 upon the fixture 22, the radar cross section of the fixture 22 is measured for various azimuth angles, differing values of azimuth angle being selected by the selector 88. The fixture 22 is positioned at an azimuth angle which minimizes the radar cross section of the fixture 22 as viewed by the antenna 14.

It is advantageous to operate the radar set 12 in a pulse mode so as to gate out ground return echoes from terrain in front of the fixture 22 and beyond the fixture 22. For example, such reflections might develop from side lobes of an antenna pattern impinging upon the ground.

With reference to FIGS. 1, 3 and 4, the motor 36 of the subject rotator 20 is driven by a servo amplifier 92 operative within a feedback loop wherein the synchro 32 feeds back an electric signal representing azimuth angle of the subject 10 relative to the direction of the beam 90 from the antenna 14. The output signal of the synchro 32 is applied to an indicator 94 of the azimuth angle of the subject 10, and is also applied to an input terminal of the amplifier 92. The amplifier 92 and the indicator 94 are located at a point of convenience external to the fixture 22. The output signal of the amplifier 92 is applied via line 96 to the motor 36, and the feedback signal from the synchro 32 is applied via line 98 to the amplifier 92 and the indicator 94. An angle selector 100, which may be of the same form as the selector 88, is manually operated to input an electric signal representing a desired azimuth of the subject 10 into the amplifier 92. The amplifier 92 forms the difference between the commanded angle of the selector 100 and the actual angle outputted by the synchro 32 to develop the output signal at line 96 which drives the motor 36 to position the subject 10 at the desired azimuth angle.

Signals for driving the motor 78 are applied thereto via line 102 from the amplifier 84. Signals outputted by the resolver 82 are applied via line 104 to the amplifier 84 and the indicator 86. The lines 96, 98, 102 and 104 pass through a central bore in the pylon 74 so as to permit a locating of the mechanical components of the rotators 20 and 72 within the fixture 22, while the aforementioned associated electronic components are located at the ground. In the fixture rotator 72, the motor 78 and the resolver 82 are supported by a plate 106 affixed to a mount 108. The mount 108 rigidly secures the plate 106 to the interior of the fixture 22. The pylon 74 passes through the mount 108 and the plate 106 to connect with the gear train 80. A bearing 110 on the plate 106 secures the fixture 22 rotatably to the pylon 74.

The invention permits the measurement of various aspects of radar cross section, particularly of subjects having a very low radar cross section. For example, the use of the invention permits measurement of cross sections associated with antennas, steps, gaps, bumps, and discontinuities in material employed in the construction of a subject. By minimizing the reflections from the fixture 22, by virtue of its shape and orientation relative to the radar antenna 14, an by previous measurement of the reflections of the fixture 22, the contribution of the radar cross section of the fixture 22 can be negated from the measurement of radar cross section of the subject 10 to enable accurate measurement even of very small radar cross sections. The effect of detail of the subject 10 on the radar cross section in producing the signature of the subject 10 can be measured as a function of azimuth angle by repeating the measurement for various values of angle entered at the selector 100. The airfoil configuration of the fixture 22 is selected to minimize radar cross section in the direction of the antenna 14, even though the configuration of the fixture 22 may actually enlarge radar cross section in other directions. This insures minimal cross section in the direction of the antenna 14. The top of the fixture 22 is flat to accommodate a flat top surface 38 in the turntable 28.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A radar test assembly of low radiation cross section for rotatably supporting a test subject to be illuminated by a radar signal from the antenna of a radar set comprising:
   a fixture,
   first rotator means for rotating the fixture,
   a platform for supporting the test subject,
   means for mounting said platform on said fixture,
   second rotator means for rotating the platform relative to the fixture,
   said fixture including a shield extending outwardly from an edge of the platform to form an envelope enclosing said first rotator and the platform and including an opening therein for receiving a test subject to be attached to the platform, the shield having electrically conducting surfaces inclined relative to a direction of propagation of radiation from the antenna for directing reflections of radiation emanating from the fixture away from the antenna, the fixture extending in curved fashion to form a body enclosing the rotator and the platform; and
   a radiation seal extending from the edge of the opening in the fixture to interface between a surface of the fixture and the platform.

2. A test device according to claim 1 wherein said seal interfaces with said fixture at edges which are inclined relative to a general direction of propagation of radiation from the antenna.

3. A test device according to claim 1 wherein the body of said fixture is configured with a generally air foil shape minimizing radar cross section in a specific direction.

4. A test device according to claim wherein said seal interfaces with said fixture at edges which are inclined relative to a general direction of propagation of radiation from the antenna.

5. A radar test assembly of low radiation cross section for rotatably supporting a test subject to be illuminated by a radar signal from the antenna of a radar set comprising:
   a fixture,
   first rotator means for rotating the fixture,
   a platform for supporting the test subject,
   means for mounting said platform on said fixture,
   second rotator means for rotating the platform relative to the fixture,
   said fixture including a shield extending outwardly from an edge of the platform to form an envelope enclosing said first rotator and the platform and including an opening therein for receiving a test subject to be attached to the platform, the shield having electrically conducting surfaces inclined relative to a direction of propagation of radiation from the antenna for directing reflections of radiation emanating from the fixture away from the antenna, the fixture extending in curved fashion to form a body enclosing the rotator and the platform, and
   a radiation seal extending from the edge of the opening in the fixture to interface between a surface of the fixture and the platform, the seal having the form of a foil with thickness substantially less than one-quarter wavelength of the radiation to inhibit generation of reflections of the radiation.

* * * * *